United States Patent [19]

Anderson

[11] Patent Number: 5,178,435
[45] Date of Patent: Jan. 12, 1993

[54] DRAIN ASSEMBLY FOR USE ON A VEHICLE

[75] Inventor: Warren H. Anderson, Sturgis, Mich.

[73] Assignee: Grumman Aerospace Corporation, Long Island, N.Y.

[21] Appl. No.: 835,402

[22] Filed: Feb. 14, 1992

[51] Int. Cl.$^5$ .............................................. B62D 25/00
[52] U.S. Cl. ....................................... 296/208; 49/476
[58] Field of Search .................... 296/208, 154; 49/476

[56] References Cited

U.S. PATENT DOCUMENTS

| | | | |
|---|---|---|---|
| 3,143,373 | 8/1964 | Fordyce | 296/208 X |
| 4,176,877 | 12/1979 | Schulz et al. | 296/208 |
| 5,105,580 | 4/1992 | Akachi et al. | 49/476 |

FOREIGN PATENT DOCUMENTS 3215195 10/1983 Fed. Rep. of Germany ...... 296/208

Primary Examiner—Charles A. Marmor
Assistant Examiner—Joseph D. Pape
Attorney, Agent, or Firm—Bacon & Thomas

[57] ABSTRACT

A drain assembly adapted for use on a vehicle includes a drain chamber having upper and lower ends each having an aperture formed therein. The aperture in the upper end is sized larger than the aperture in the lower end. When a pressure differential exists between the two apertures and liquid is present in the drain chamber, a portion of this liquid will be retained in the chamber to create a fluid seal. The drain chamber itself may be constructed of various sections that are connected together and which may be readily separable in order to clean any debris that may collect within the chamber.

9 Claims, 3 Drawing Sheets

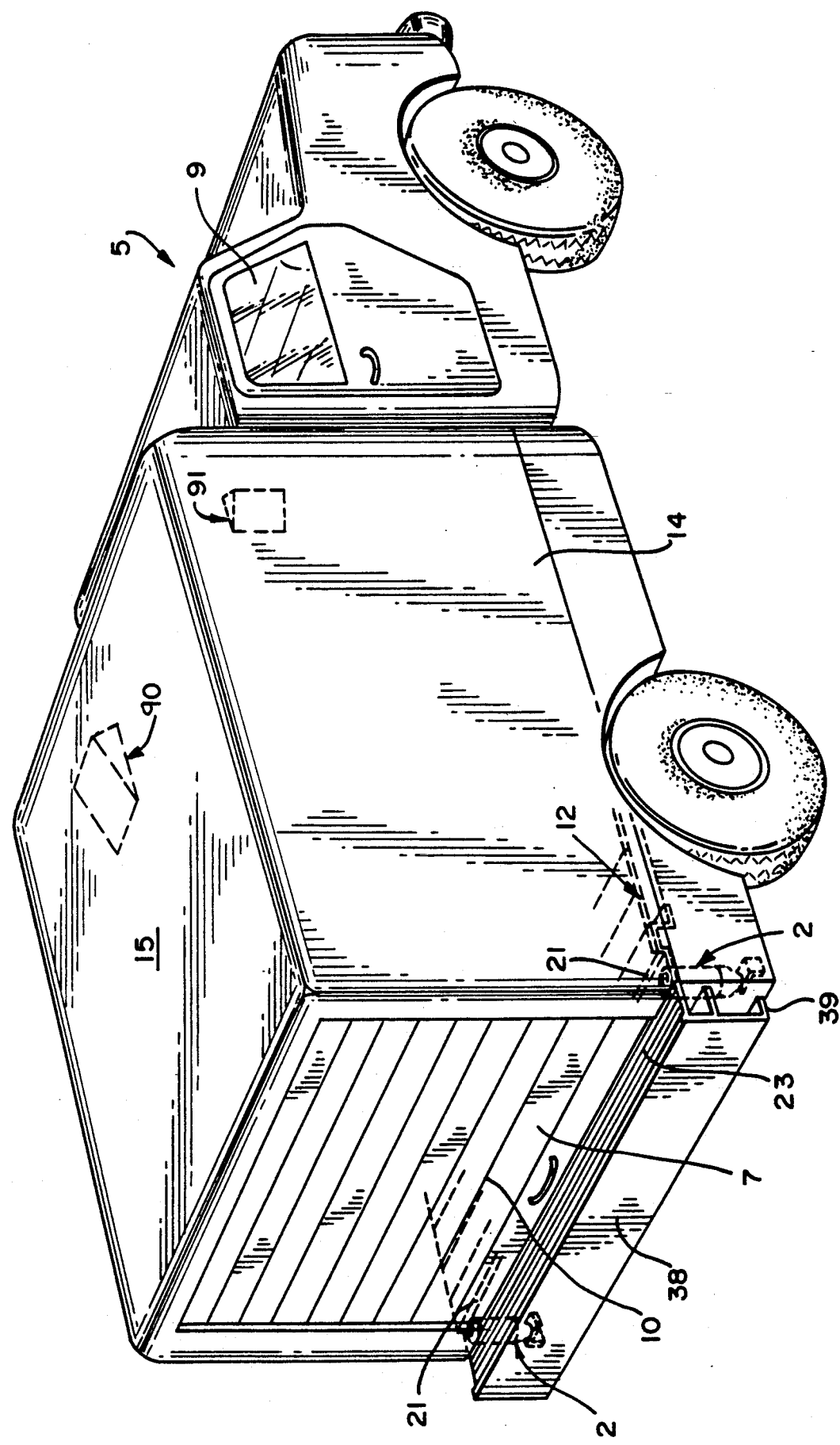

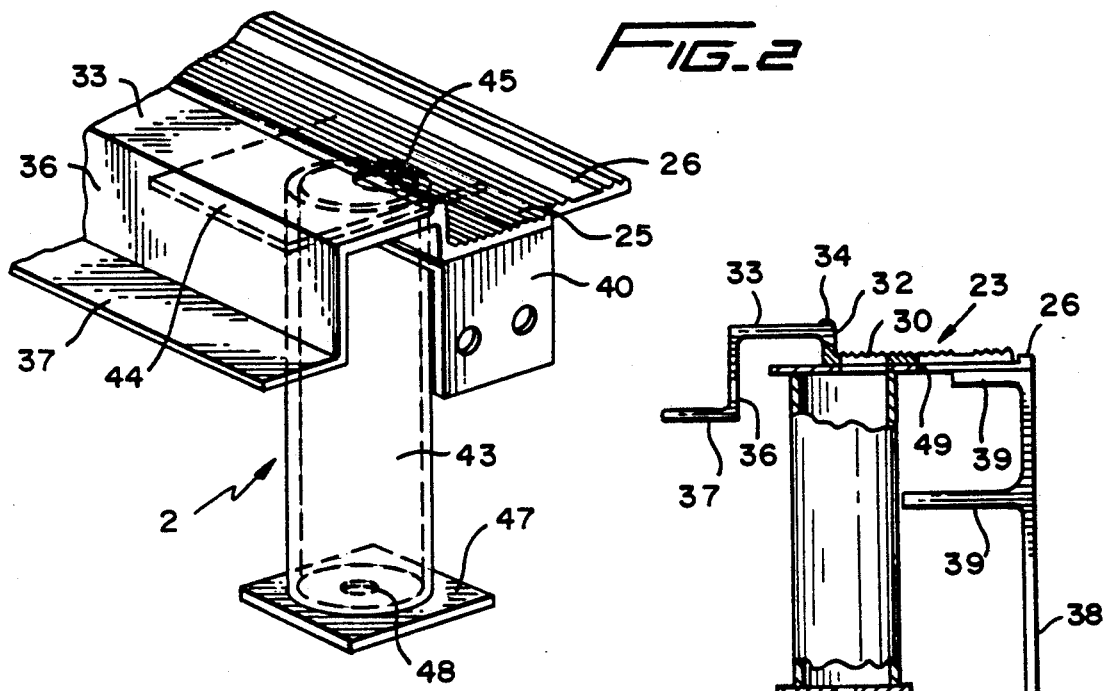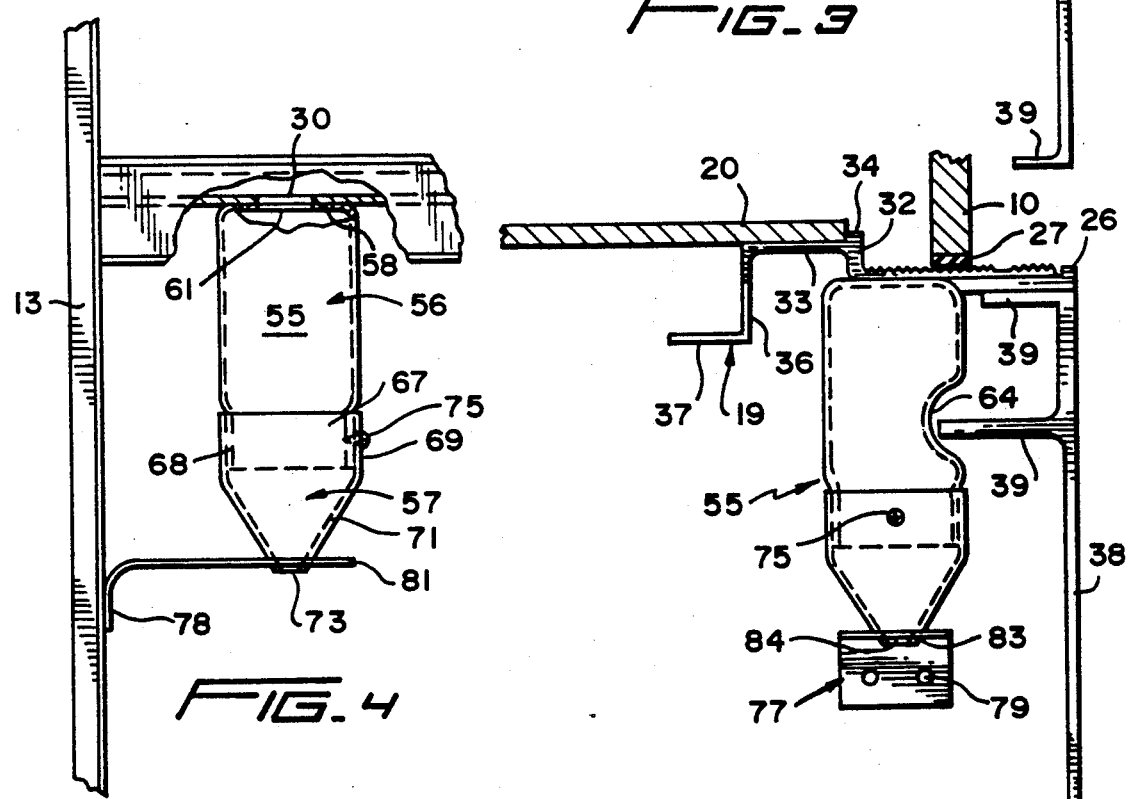

DRAIN ASSEMBLY FOR USE ON A VEHICLE

BACKGROUND OF THE INVENTION

This invention pertains to a drain assembly adapted for use on a vehicle and more specifically to a generally vertically oriented drain chamber having inlet and outlet apertures at respective upper and lower ends thereof and which is adapted to retain drainage liquid within the chamber in order to create a fluid seal when a pressure differential exists between the inlet and outlet apertures.

In the art of vehicles, particularly trucks and vans with enclosed cargo areas, it is known to provide some means to provide for drainage of any liquid, such as water, that gathers in low-lying areas of the vehicle. In a van, such a drainage device could be provided at a sill area of a rear step plate. In most instances, a drainage hole is simply provided in order for the liquid to flow therethrough.

Simply providing drain holes in a low-lying step plate area of an enclosed van for example, creates various problems especially in a van having a rear roll-up door and a cargo area that is open to the vehicle driver area. For instance, when the truck is moving above a certain speed, a pressure differential can develop between the inside of the truck and the outside ambient atmosphere, with the pressure inside the truck being lower than ambient. When this pressure differential is high enough, liquid outside the vehicle can collect inside the truck by being siphoned through the drainage holes or seeping between a seal located along the bottom of a roll-up door and a step plate. If only a drainage hole as known in the prior art is provided, this collected water can be sprayed onto the cargo floor by the air flowing through the hole into the low pressure cargo area. In addition, during the summer and winter seasons, a substantial temperature differential can exist between the inside of the truck and the outside of the truck. This siphoning effect creates a forced heat transfer circulation between the inside and outside of the truck which is undesirable, especially at relatively high speeds.

There exists a need for a drainage arrangement that can be utilized between areas having a pressure differential therebetween which will prevent liquid from being siphoned from the high pressure area to the low pressure area by creating a liquid seal therebetween. Such a drainage and seal arrangement can be utilized in various arts.

It is therefore the object of the present invention to provide a drainage assembly capable of creating a liquid seal between two areas between which a pressure differential is created. It is a further object of the present invention to provide a drain assembly which is passive, not requiring moving parts; which may be readily cleaned, if necessary; may be easily retrofitted for use in various environments; and which will function in a simple and reliable manner.

BRIEF SUMMARY OF THE INVENTION

The present invention provides a passive drain assembly for use between two areas having a pressure differential therebetween such that a portion of any liquid that collects within the drain assembly will be retained due to the pressure differential in order to create a liquid seal between these two areas.

As contemplated by the present invention, the drain assembly comprises a generally vertically oriented drain chamber having an upper end and a lower end, each end having an aperture formed therein. The aperture in the upper end is sized, however, larger than the aperture in the lower end. Thus, when the pressure at the lower aperture is higher than the pressure at the upper aperture and liquid is present in the drain chamber, a portion of this liquid will be held up in the chamber by the pressure differential to create a fluid seal until the pressure outside the chamber at the lower end drops.

In order to aid in cleaning the drain chamber from any debris that may collect therein, the drain chamber may be formed from various separable sections. Furthermore, due to its simple construction, the drain assembly of the present invention can be readily retrofitted for use in various environments.

These and other aspects of the present invention will become more readily apparent by reference to the following detailed description of preferred embodiments shown in the drawings.

BRIEF DESCRIPTION OF THE DRAWINGS

FIG. 1 is a partial schematic view of a truck body incorporating the drain assembly of the present invention.

FIG. 2 shows a perspective view of the step plate assembly of the truck shown in FIG. 1 with a drain assembly according to a first embodiment of the present invention secured thereto.

FIG. 3 shows a cross sectional view of the drain assembly and mounting shown in FIG. 2.

FIG. 4 shows a drain assembly according to a second embodiment of the present invention attached to a step plate assembly of a truck.

FIG. 5 is a cross sectional view similar to that shown in FIG. 3, but of the second embodiment of the invention as depicted in FIG. 4.

DETAILED DESCRIPTION OF THE PREFERRED EMBODIMENTS

Figure 6:
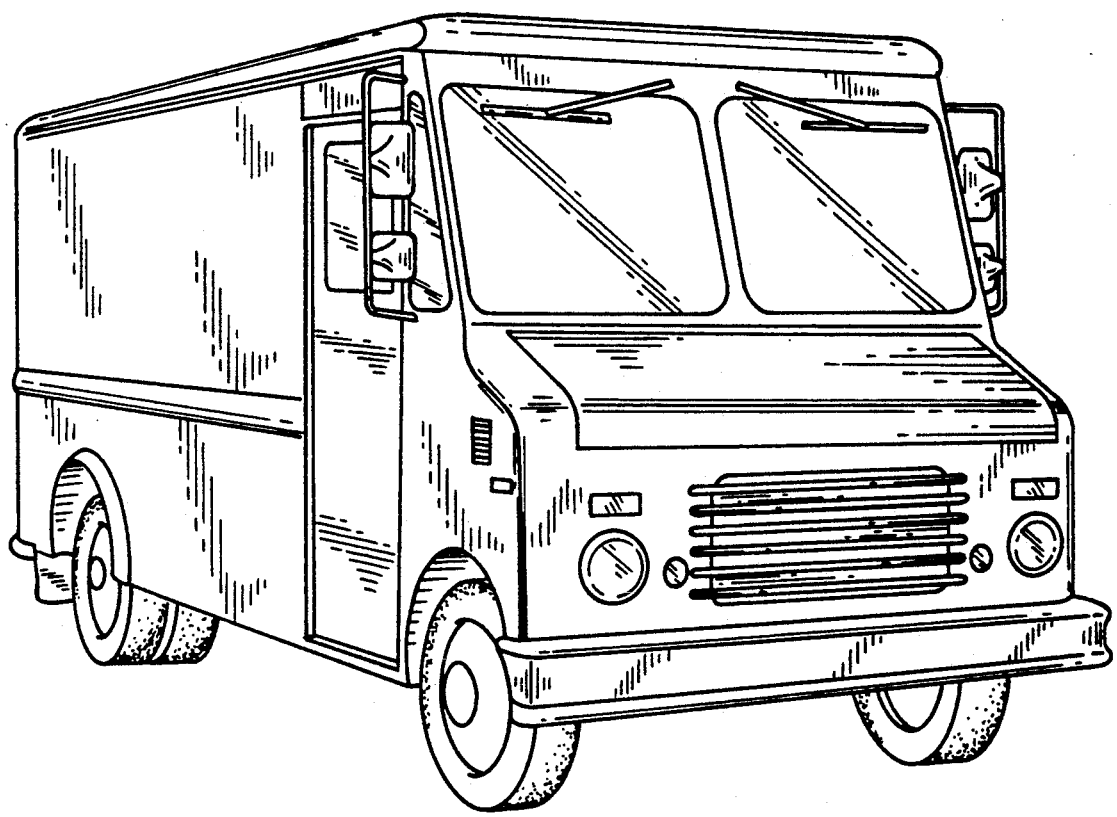
FIG. 6 shows a schematic view of another type of truck body to which the drain assembly of the present invention is applicable.

With initial reference to FIG. 1, the drain assembly 2 of the present invention is shown mounted on a truck or van 5 having an enclosed volume constituting a cargo area 7 which may be open to a driver area 9 and which includes a rear roll-up door 10. Cargo area 7 is defined by a floor 12, sidewalls 13, 14, roof 15 and the rear roll-up door 10. With reference to FIGS. 1 and 5, floor 12 is supported upon various transversely extending, L-shaped support brackets 19 which rest upon various longitudinally extending bolsters (not shown) as is commonly known in the art. Floor 12 itself is formed from various interlocking transversely extending panels 20 which carry additional L-shaped support brackets 19 for support thereof as is also widely known in the art and will therefore not be further discussed in detail.

As clearly shown in FIGS. 2, 3 and 5, the rearmost L-shaped support bracket 19 is formed as an integral part of a rear step or sill assembly 23. Rear step assembly 23 further includes a flat, corrugated step area 25 including a smooth, noncorrugated bead section 26 for riveting purposes as will be more fully discussed below. Step area 25 is adapted to be engaged by a resilient seal or the like 27 secured to the bottom edge of rear roll-up door 10. Step area 25 is defined between a transversely extending ridge 29 and an upwardly extending wall 32 and includes liquid drain aperture 30 located at each corner 21 towards which step area 25 is slightly sloped. Integrally formed with upwardly extending wall 32 is a flat, floor panel support section 33. Extending along the portion of flat, floor panel support section 33 above upwardly extending wall 32 is an elongated, transverse nub 34. The end of flat, floor panel support section 33, opposite nub 34, is formed integral with L-shaped joist support bracket 19 which includes a downwardly extending plate 36 terminating in a horizontal plate 37. As is clearly evident in the figures, the rearmost floor panel 20 rests upon flat, floor panel support section 33 and engages nub 34 in order to prevent shifting of the floor panels 20 in the longitudinal direction of the vehicle.

Although not shown in FIGS. 2 and 4 for simplicity, rear step plate assembly 23 also includes a downwardly extending end plate 38 having various horizontal legs 39 which may be fixedly secured to the frame of the vehicle by any means known in the art such as welding, bolting, etc. The uppermost leg 39 is secured to step area 25 by means of rivets (not shown) located in non-corrugated bead section 26. In addition, the transverse ends of rear step plate assembly 23 may have secured thereto mounting clips 40 for fastening rear step assembly 23 to the side frame (not shown) of truck 5.

Reference will now be made to FIGS. 2 and 3 which show the drain assembly 2 according to a first embodiment thereof. Drain assembly 42 comprises a vertically oriented cylindrical chamber 43 having open ends. Secured to the upper end of cylindrical chamber 43 is an upper plate 44 having a first aperture 45 therein. Secured to the lower end of cylindrical chamber 43 is a lower plate 47 having a second aperture 48 therein. Upper plate 44 is welded or otherwise fixedly secured to a lower surface 49 of step area 25 such that first aperture 45 is aligned with aperture 30. It should be noted that first aperture 45 is sized larger than second aperture 48 as will be discussed more fully below. Also, it will be seen that the first and second apertures and the chamber 43 normally permit direct substantially uninterrupted flow of liquid between the apertures.

Reference is now made to FIGS. 4 and 5 which depict a drain chamber 55 according to a second embodiment of the invention. Drain chamber 55 includes a first, upper section 56 and a second, lower section 57. The top end 58 of upper section 56 is formed with a first aperture 61. Due to the presence of horizontal leg 39 of rear step assembly 23, a central portion of upper section 56 includes a concave section 64. Bottom end 67 of upper section 56 includes a reduced diameter portion 68 and is open.

Lower section 57 of drain chamber 55 includes a cylindrical section 69 and a tapered lower end portion 71. Cylindrical section 69 is sized to snugly receive reduced diameter portion 68 of upper section 56 in telescoping relationship. Tapered lower end portion 71 is formed with a second aperture 73 which is sized smaller than first aperture 61 as will be explained more fully hereinafter.

Upper and lower sections 56, 57 of drain chamber 55 are detachably secured together by means of a readily removable screw 75. In the event that any debris collects within drain chamber 55, lower section 57 can be easily disassembled from upper section 56 by removal of screw 75 in order to clean the inside of drain chamber 55. To provide additional support, an L-shaped support plate 77 having an attaching leg 78 may be fixedly secured to side wall 13 by any fastener means 79 known in the art such as rivets, bolts, screws etc. and includes a cantilevered leg 81 having a hole 83 through which a tip portion 84 of tapered lower end portion 71 may extend. Cantilevered leg 81 is rather resilient and therefore can be readily moved downward to separate lower section 57 from upper section 56 and will spring back to its original position.

In the preferred arrangement as is common to both of the above-described embodiments, two drain assemblies 2 are mounted to rear step assembly 23 adjacent sidewalls 13, 14 and step or sill area 25 is arranged such that any liquid flowing thereupon will drain to these areas. In almost all circumstances, this liquid will constitute water which seeps beneath seal 27 of rear roll-up door 10. If the vehicle is stationary or moving at relatively slow speeds, e.g. approximately 25 mph, any water in the vehicle that reaches these areas will flow into first aperture 45 or 61, through chambers 43 or 55 and directly out second apertures 48 or 73 respectively without substantial interruption (i.e., there is no liquid trap or the like in the chamber). If, however, the vehicle is traveling above a certain speed (depending on the vehicle), a substantial pressure differential can be created between cargo area 7 and the ambient atmosphere. Since first aperture 45 or 61 is exposed to the pressure within truck 5, so is the drain chamber 43 or 55. However, second aperture 48 or 73 is exposed to the pressure outside the truck which also exposes drain chamber 43 or 55 to this pressure.

Since the outside truck pressure can be greater than the pressure inside the truck, any drainage liquid will collect within drain chamber 43 or 55 until the gravitational force acting on the liquid equals the pressure differential force developed between the inside and outside of the truck. When this occurs, an equilibrium condition will have been reached. If additional liquid enters through the first aperture 45 or 61, the same amount of liquid will leave the second aperture 48 or 73. Therefore, so long as this pressure differential is maintained, a predetermined amount of drainage liquid will be retained within drain chamber 43 or 55 to create a liquid seal between the inside and the outside of the truck. Of course, as the pressure differential diminishes, additional liquid will drain out of the drain assembly 2, but by this arrangement, when the pressure differential does exist and liquid is present in the chamber, the liquid seal will be created which will prevent water from being splashed onto cargo floor 12 and ambient air from being siphoned through the drain assembly into the cargo area 7. Thus, when the fluid seal exists, heat transfer through the drain assembly 2 between the inside of truck 5 and the ambient atmosphere due to circulation of air is also prevented.

At intermediate speeds, fluid entering drain chamber 43 or 55 will slowly drain or may remain therein depending on the pressure differential. Of course, the necessary pressure differential and the level of liquid to be retained in the drainage chamber can be easily varied by adjusting the relative diameters of the apertures 45, 48 and 61, 73 respectively. These diameter variations are, in actuality, rather limited since apertures 48 and 73 must be made relatively small to prevent the liquid from simply draining straight through drain chamber 43 or 55.

Of course, it is to be understood that this drain arrangement has particular application under conditions where it is desired to drain an enclosed chamber, such as vehicle body, into an area where the aforesaid pressure differential occurs. In the specific embodiment illustrated, it is desired to drain fluid which seeps under the rear door seal onto a step area in a vehicle where a higher pressure occurs relative to the interior of the vehicle body. The invention has particular application in vehicles which have cargo areas open to a driver area, as previously emphasized, since such cargo areas experience a negative pressure relative to the surrounding atmosphere when driving at relatively high speeds with a window open for instance. A walk-in or step type van, such as the one shown in FIG. 6, exemplifies another known type of vehicle in which these pressure differentials are experienced. The invention can also be used in vehicles with separate cargo and driver areas wherein vents, such as indicated at 90 and 91 in FIG. 1 would create a similar negative pressure situation. It should also be recognized that other exterior portions of the vehicle body could experience lower pressures than the interior of the vehicle body, in which case a normal drain arrangement could be used, as well as the drain in accordance with this invention. Accordingly, this invention solves the problem of maintaining a seal at and draining a vehicle body towards an area where a pressure higher than the interior of the vehicle body exists.

It is also to be understood that various forms of the invention herein shown and described are to be taken as a preferred embodiment thereof and the various changes in shape, material, size and arrangement of parts may be resorted to without departing from the spirit of the invention. For instance, the drain chamber may take the form of various polygonal shapes. In addition, instead of providing a single aperture at the upper and lower ends of each drain chamber assembly shown and described, a plurality of apertures may be present and even a screen-like opening may be used which could aid in preventing the accumulation of any debris within the drain chambers. Also, the drain chamber need not be absolutely vertically oriented, but could assume any sloped inclination, so long as the upper inlet aperture is above the lower outlet aperture. In general, the invention may take the form of various embodiments and should be limited only by the scope of the following claims.

I claim:

1. A drain assembly adapted for use on a vehicle having an enclosed volume comprising:
   a generally vertically oriented drain chamber having an upper end and a lower end, said drain chamber comprising an elongated tube having upper and lower end plates fixedly secured thereto;
   first aperture means in communication with a first pressure zone for admitting a liquid into the chamber formed in said upper end;
   second aperture means in communication with a second pressure zone for draining liquid from the chamber formed in said lower end;
   said first and second aperture means and said drain chamber arranged to normally convey liquid without substantial interruption between said first and second pressure zones, said first and second aperture means being formed in said upper and lower end plates, respectively;
   said first aperture means being sized larger than said second aperture means such that when a predetermined pressure differential exists between said first and second aperture means with liquid in the drain chamber, said pressure differential will retain at least a portion of the liquid in the chamber to thereby maintain a liquid seal between said first and second aperture means.

2. A drain assembly as claimed in claim 1, wherein said elongated tube is cylindrical in shape.

3. A drain assembly adapted for use on a vehicle having an enclosed volume comprising:
   a generally vertically oriented drain chamber having an upper end and a lower end, said drain chamber including at least two sections;
   means for detachably securing said at least two sections of said drain chamber together;
   first aperture means in communication with a first pressure zone for admitting a liquid into the chamber formed in said upper end;
   second aperture means in communication with a second pressure zone for draining liquid from the chamber formed in said lower end;
   said first and second aperture means and said drain chamber arranged to normally convey liquid without substantial interruption between said first and second pressure zones;
   said first aperture means being sized larger than said second aperture means such that when a predetermined pressure differential exists between said first and second aperture means with liquid in the drain chamber, said pressure differential will retain at least a portion of the liquid in the chamber to thereby maintain a liquid seal between said first and second aperture means.

4. A drain assembly as claimed in claim 3, wherein said drain chamber tapers along a predetermined portion thereof between said upper and lower ends.

5. A drain assembly as claimed in claim 3, wherein said drain chamber tapers toward said second aperture along a predetermined portion between said upper and lower ends.

6. A drain assembly as claimed in claim 3, wherein said sections are telescopingly assembled to each other.

7. A drain assembly as claimed in claim 6, wherein one of said sections comprises an upper section having said first aperture means formed in an upper end thereof and the other of said sections comprises a lower section which telescopingly receives said upper section and includes said second aperture means in a lower end thereof.

8. A drain assembly as claimed in claim 7, wherein a lower end portion of said lower section tapers to said second aperture means.

9. A drain assembly as claimed in claim 1 further comprising:
   a vehicle having an enclosed volume comprising said first pressure zone;
   said drain chamber being secured to said vehicle body with said first aperture means communicating with said enclosed volume at a predetermined location where drainage liquid in said enclosed volume collects, and wherein said second pressure zone is an area external of the enclosed volume at a location where ambient pressure is higher than the enclosed volume when said vehicle is moving above a predetermined speed, whereby when said vehicle moves above said predetermined speed, the resultant pressure differential developed between said enclosed volume and the ambient pressure prevents complete drainage of drainage liquid in the drain chamber to thereby provide a liquid seal between said enclosed volume and ambient atmosphere.

* * * * *